United States Patent [19]

Kodama et al.

[11] Patent Number: 5,139,358
[45] Date of Patent: Aug. 18, 1992

[54] PART MOUNT DEVICE

[75] Inventors: Taketomo Kodama, Tokyo; Yoetsu Yokocho, Ome, both of Japan

[73] Assignee: Kioritz Corporation, Tokyo, Japan

[21] Appl. No.: 696,651

[22] Filed: May 7, 1991

[30] Foreign Application Priority Data

May 9, 1990 [JP] Japan ................ 2-48377[U]

[51] Int. Cl.⁵ .................................................. B25G 3/00
[52] U.S. Cl. ................................. 403/7; 403/344; 16/116 R
[58] Field of Search .................... 16/116 R, 111 R; 403/344, 373, 7

[56] References Cited

U.S. PATENT DOCUMENTS 1,785,111 12/1930 Crickmer ..................... 16/116 R
4,761,939 8/1988 Zerrer .
4,837,892 6/1989 Lo ........................ 16/111 R X

FOREIGN PATENT DOCUMENTS 216590 5/1990 Japan .

Primary Examiner—Andrew V. Kundrat
Attorney, Agent, or Firm—Browdy and Neimark

[57] ABSTRACT

A part mounting device including a fixing metal member which is, in the inside of a synthetic-resin member, fixed to the other periphery of a metal member by the clamping force of a clamp screw. Inward protrusions are integrally formed on the synthetic-resin member, protruding radially inward. Engagement holes are formed in the fixing metal member for receiving the inward projections fitted into and engaged with the engagement holes. A bore is formed in the synthetic-resin member for inserting the clamp screw into the inside of the synthetic resin member.

1 Claim, 2 Drawing Sheets

PART MOUNT DEVICE

BACKGROUND OF THE INVENTION

The present invention relates to a part mounting device used to mount, for example, a throttle grip made of synthetic resin on the operation rod of a grass trimmer.

In general, a work machine such as a grass trimmer has a throttle grip with a throttle lever, which is mounted on the operation rod of the machine. The operator performs such an operation as trimming grass while he holds the throttle grip to direct the operation rod to the desired direction and to operate the throttle lever of the throttle grip to thereby control the operation of the internal combustion engine of the machine. Conventionally, in such a work machine, the throttle grip, which is made of a synthetic resin material, has been mounted on the operation rod, which is made of a metal material, by directly fastening the throttle grip onto the operation rod. When the throttle grip is mounted in this manner, however, there is a risk that, during an operation, the throttle grip may slide and be displaced relative to the operation rod in the longitudinal or circumferential direction of the operation rod, thereby hindering the operation. In order to avoid this risk, a structure is known in which the throttle grip is fastened by a sheet-metal band disposed over the grip so that the throttle grip is more firmly mounted on the operation rod. However, even this structure cannot completely prevent the throttle grip from becoming loose. In addition, the structure has a disadvantage in that since the band is exposed to the outside, the band spoils the good appearance and the safety characteristics which are required in the products.

SUMMARY OF THE INVENTION

The present invention has been accomplished to eliminate the above-described drawbacks of the prior art. An object of the present invention is to provide a part mounting device that is capable of securely mounting a synthetic-resin member such as a throttle grip on a metal member such as an operation rod without spoiling the good appearance the safety characteristics of the products. The device is simple in structure and easy to produce and assemble.

According to the present invention, there is provided a device for mounting a synthetic-resin member on a metal member, comprising: a fixing metal member which is, in the inside of the synthetic-resin member, fixed to the outer periphery of the metal member by the clamping force of a clamp screw; at least one inward protrusion integrally formed on the synthetic-resin member and protruding radially inward thereof; at least one engagement hole formed in the fixing metal member for receiving the inward protrusion fitted into and engaged with the hole; and a bore formed in the synthetic-resin member for inserting the clamp screw into the inside of the synthetic resin member.

With the above-specified construction, the fixing metal member is rigidly and securely fixed to the metal member. The synthetic-resin member has its at least one inward protrusion fitted into and engaged with the hole of the fixing metal member, whereby the synthetic-resin member is held in position in such a manner that it is prevented from being displaced in either the longitudinal or the circumferential direction of the operation rod. The fixing metal member and the clamp screw fixing it on the operation rod are both disposed in the inside of the synthetic-resin member, and neither of them are exposed to the outside. Thus, the part mounting device according to the present invention maintains the good appearance and the safety characteristics of the products at satisfactory level, it has a simple structure, and it can be produced and assembled with ease.

PREFERRED EMBODIMENT OF THE INVENTION

The present invention will now be described with reference to the drawings showing an embodiment thereof.

Figure 1:
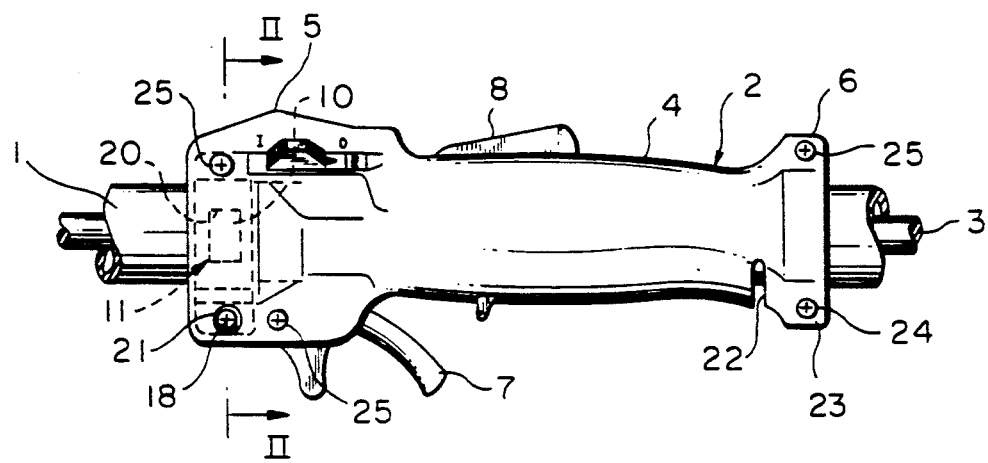
FIG. 1 is a side view of a device for mounting a throttle grip on an operation rod, showing an embodiment of the present invention.
Figure 2:
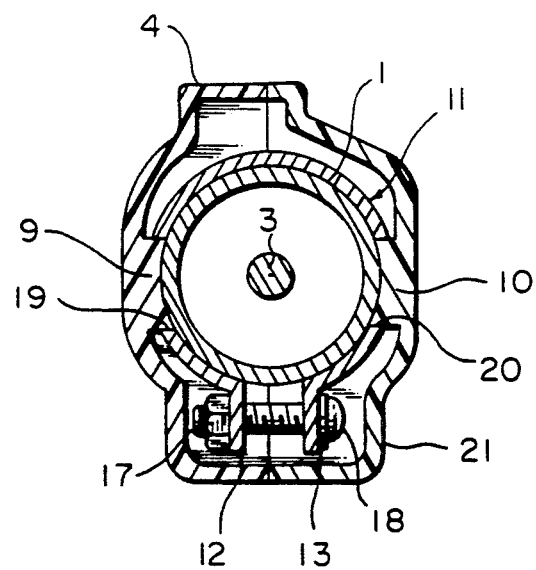
FIG. 2 is an enlarged sectional view taken along the line II—II shown in FIG. 1 in the direction of the arrows.

The illustrated embodiment includes an elongated operation rod 1 made of a metal material such as aluminum for use, mainly, in a machine such as a grass trimmer, and a throttle grip 2 made of a synthetic resin material with a suitable degree of flexibility and mounted, by a mounting operation, described later, on an outer peripheral surface of the operation rod 1 in such a manner as to surround it. An internal combustion engine (not shown), serving as the power source, is provided at the rear end of the operation rod 1, while a cutter blade (not shown) is provided at the front end of the operation rod 1. A transmission shaft 3 extends from the internal combustion engine through the operation rod 1 so that the cutter blade can be rotated and driven through the shaft 3 to perform an operation such as a grass trimming operation. The throttle grip 2 is composed of two parts (left side and right side parts, as viewed in FIG. 2) divided along the axis of the operation rod 1 and formed with a suitable synthetic resin. These parts are assembled into a cylindrical shape having a relatively thin wall structure, which, as a whole, surrounds the outer periphery of the operation rod 1. The throttle grip 2 has three portions integrally formed with each other, that is, a central portion 4 to be held by the operator, a forward portion 5 in front of the central portion 4, and a rearward portion 6 behind the central portion 4, and the operation rod 1 extends through the inside of these portions. The forward portion 5 has a throttle lever 7 pivotally supported at a lower position thereof, the throttle lever 7 extending toward the central portion 4. The central portion 4 has a locking lever 8 pivotally supported at an upper position thereof, the locking lever 8 being provided to lock the throttle lever 7 in its idling position. The throttle lever 7 is connected to the throttle valve (not shown) of the internal combustion engine via a cable (not shown). The two levers 7 and 8 are arranged such that, during an operation, when the operator releases the throttle lever 7 by depressing the lock lever 8 by a palm, and operates the throttle lever 7 by a finger, he can control the operation of the internal combustion engine.

Figure 3:
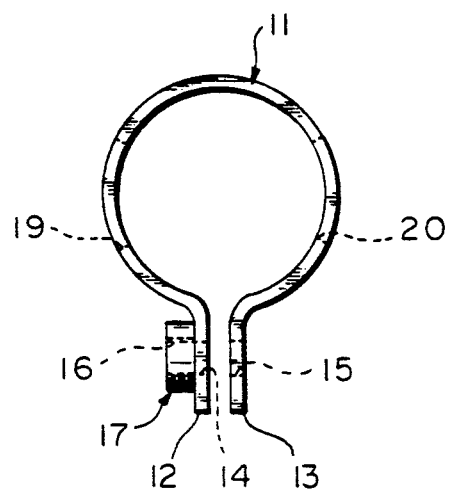
FIG. 3 is an enlarged front view of a fixing metal member of the embodiment shown in FIG. 1.
Figure 4:
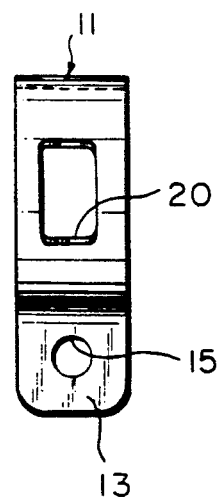
FIG. 4 is a side view of the fixing metal member, viewed from the right side of FIG. 3.

The throttle grip 2 further has a pair of mutually opposing inward protrusions 9 and 10 which are formed integrally with the throttle grip 2 on the inner surface of the forward portion 5 and protruded radially inward to abut on the outer peripheral surface of the operation rod 1. A band-shaped fixing member 11 made of a metal material such as a thin steel plate is wound on a region of the outer peripheral surface of the operation rod 1 in which the inward protrusions 9 and 10 abut on that outer peripheral surface. The fixing metal member 11 has first and second end portions 12 and 13 which extend substantially parallel with each other from a lower position of the operation rod 1. As shown in FIGS. 3 and 4, the first and the second end portions 12 and 13 have mutually aligned first and second through-holes 14 and 15 formed therein. The first end portion 12 of the fixing metal member 11 has a nut 17 formed integrally with the end portion 12 on the outer side surface thereof. The nut 17 has a threaded hole 16 formed coaxially with the first through-hole 14. A clamp screw 18 extending through the through-holes 14 and 15 is screwed into the threaded hole 16 of the nut 17 in the manner described later. The fixing metal member 11 has engagement holes 19 and 20 formed through a portion of the member 11 which is wound on the outer peripheral surface region of the operation rod 1, the engagement holes 19 and 20 receiving the inward protrusions 9 and 10 of the throttle grip 2, respectively, which are engaged with the engagement holes 19 and 20 and are locked therein. Thus, the inward protrusions 9 and 10 of the throttle grip 2 are fitted into the respective engagement holes 19 and 20 of the fixing metal member 11, to abut on the region of the outer peripheral surface of the operation rod 1.

Further, the throttle grip 2 has a bore 21 formed on one side of the forward portion 5 at a position close to the second end portion 13 of the fixing metal member 11. The bore 21 is arranged to be aligned with the through-hole 15 of the second end portion 13 of the fixing metal member 11. Still further, the throttle grip 2 has a slot 22 circumferentially extending in a lower portion of the boundary between the central portion 4 and the rearward portion 6, as well as a pair of flanges 23 (left side and right side flanges) formed at lower positions of the rearward portion 6 and axially separated apart from the central portion 4. The flanges 23 are adapted to fasten on the outer periphery of the operation rod 1 in cooperation with a machine screw 24 screwed into these flanges 23.

A mounting operation is performed in the following manner. The throttle grip 2, which is divided into the left side and right side parts, has its inward protrusions 9 and 10 respectively fitted into the engagement holes 19 and 20 of the fixing metal member 11, and, after the throttle lever 7 and the lock lever 8 are assembled onto the throttle grip 2, the throttle grip 2 has its left side and right side parts integrated with each other by screws 25, thereby preparing a throttle grip assembly before a mounting operation. Then, the operation rod 1 is inserted into the throttle grip assembly from the side of the forward portion 5 of the throttle grip 2, and the fixing metal member 11 is slid on the outer peripheral surface of the operation rod 1. When the throttle grip 2 is positioned at a predetermined position relative to the operation rod 1, the clamp screw 18 is passed through the bore 21 formed in the forward portion 5 of the throttle grip 2, and then passed through the through-holes 15 and 14 of the fixing metal member 11 so that the clamp screw 18 engages with the threaded hole 16 of the nut 17. The clamp screw 18 is screwed into the threaded hole 16 by a tool, such as a screw-driver, inserted through the bore 21, thereby rigidly and securely fixing the fixing member 11 made of a metal material to the outer peripheral surface of the operation rod 1 also made of a metal material. In this condition, the throttle grip 2, whose inward protrusions 9 and 10 are respectively fitted into and engaged with the engagement holes 19 and 20 of the fixing metal member 11, is held in position while prevented from being displaced relative to the operation rod 1 in either the longitudinal or the circumferential direction of the rod 1. Further, the fixing metal member 11 and the clamp screw 18, which are both in the inside of the throttle grip 2 and are not exposed to the outside, do not spoil the good appearance and the safety characteristics of the operation rod 1 and the throttle grip 2 as products. The fixing of the throttle grip 2 to the operation rod 1 can be reinforced by fastening the left side and the right side flanges 23 at lower positions of the rearward portion 6 of the throttle grip 2 by the machine screw 24.

What is claimed is:

1. A device for mounting a synthetic-resin member assembled from parts into a cylindrical shape having a thin wall structure on a metal member, comprising: a fixing metal member fixed to an outer periphery of said metal member by a clamping force of a clamp screw; at least one inward protrusion integrally formed on said synthetic-resin member and protruding radially inward therefrom; at least one engagement hole formed in said fixing metal member for receiving said inward protrusion fitted into and engaged with said hole when assembling said synthetic-resin member; and a bore formed in said synthetic-resin member for inserting said clamp screw into the inside of said synthetic resin member.

* * * * *